L. B. BARTH.
FERTILIZER DISTRIBUTER.
APPLICATION FILED NOV. 24, 1909. RENEWED JAN. 3, 1912.
1,033,297.
Patented July 23, 1912.
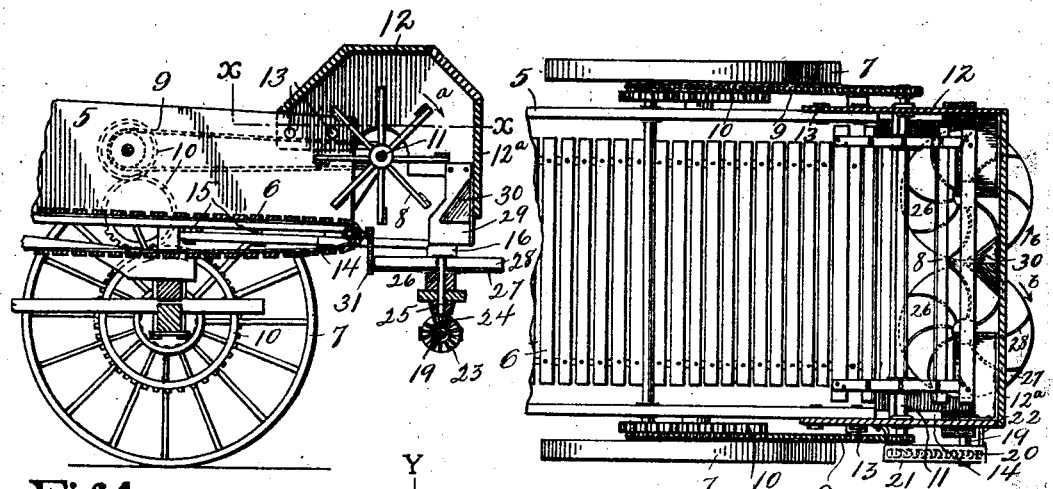
Fig.1
Fig.2
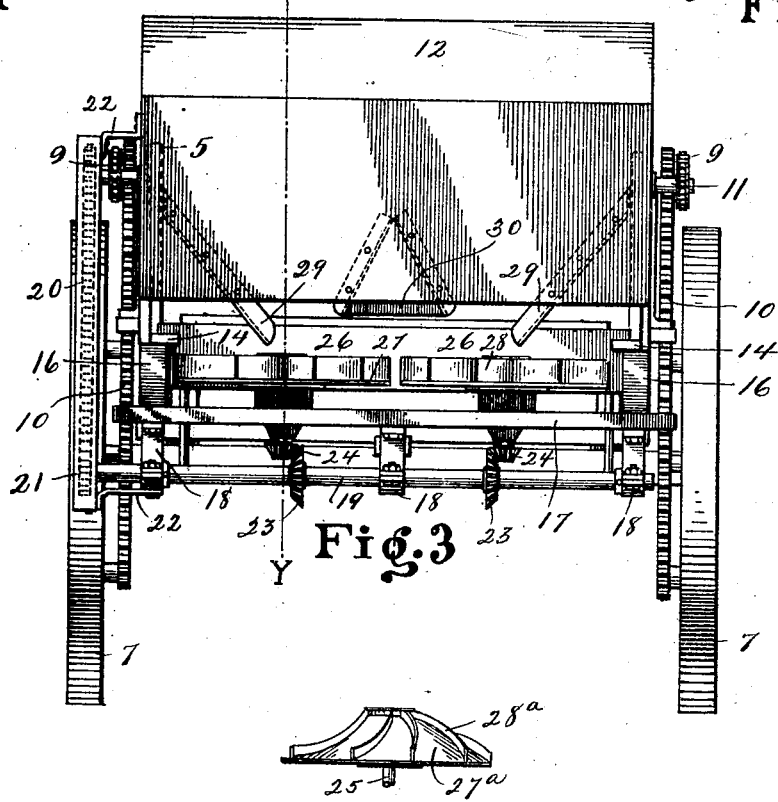
Fig.3
Fig.4
Witnesses
T. Fitzhugh Knox
Clayton L. Drew
Inventor
Luther B. Barth,
By Shepherd & Campbell,
his Attorneys

UNITED STATES PATENT OFFICE.

LUTHER B. BARTH, OF TIFFIN, OHIO.

FERTILIZER-DISTRIBUTER.

1,033,297.  Specification of Letters Patent.  Patented July 23, 1912.

Application filed November 24, 1909, Serial No. 529,705. Renewed January 3, 1912. Serial No. 669,236.

*To all whom it may concern:*

Be it known that I, LUTHER B. BARTH, citizen of the United States of America, residing at Tiffin, in the county of Seneca and State of Ohio, have invented certain new and useful Improvements in Fertilizer-Distributers, of which the following is a specification.

This invention relates to fertilizer distributers or spreaders of the character adapted to be driven over the ground to discharge the fertilizer therefrom during its passage over the ground.

The object of the present invention is to provide an attachment for a fertilizer distributer conveyance by means of which the fertilizer may be more thoroughly pulverized and discharged and scattered over a much wider swath than has heretofore been possible.

It is a further object of the invention to provide an attachment which may be readily applied to a fertilizer distributer of the beater type with very little trouble and at a very small cost.

Further objects and advantages of the invention will be set forth in the detailed description which now follows.

In the accompanying drawing, Figure 1 is a partial vertical section upon line $y$—$y$ of Fig. 3 of a fertilizer distributer of the beater type having my invention applied thereto, Fig. 2 is a horizontal section upon line $x$—$x$ of Fig. 1, Fig. 3 is a rear end elevation, and, Fig. 4 is a detail view of a modified form of distributer member hereinafter described.

Like numerals designate corresponding parts in all of the figures of the drawing.

My attachment is designed to be applied to an ordinary fertilizer distributer of the beater type, comprising the body 5, the rearwardly moving slatted bottom 7, ground wheels 7, beater 8, and driving mechanism comprising the sprocket drive 9 and the spur gear drive 10, by means of which motion is transmitted from the ground wheel 7 to the shaft 11 of the beater. So far, the parts described are all well known in this art and require no further description.

In carrying out my invention, I secure a hood 12 in such position as to inclose the beater. This hood may be secured to the body 5 in any desired manner. In the present instance, I have shown bolts 13 which pass through the side walls of the hood 12 and through the body 5 and hold the hood firmly in position. Rearwardly projecting bars 14 are secured to the underside of the body 5 by bolts 15, these bars serving to support oppositely rotating distributer members beneath and slightly in the rear of the beater. The bars 14 at their outer ends are secured to blocks 16, these blocks in turn being secured to a cross bar 17. Hangers 18 extend from the underside of this cross bar and a shaft 19 is journaled in these hangers. This shaft is driven by a sprocket chain connection 20 from the beater shaft 11, (see Fig. 3) this sprocket chain being preferably inclosed by a guard 21 which is held in position by brackets 22. The shaft 19 carries bevel gears 23 which mesh with bevel pinions 24 mounted upon the shafts 25 of oppositely rotating distributer members 26. In the form of distributer member shown in Figs. 1, 2, and 3, I employ plane disks 27 having the radially arranged curved blades 28 upon their upper faces. If desired, however, other forms of horizontally rotating distributer members may be employed. Such for instance as that illustrated in Fig. 4, where the blades 28$^a$ are shown applied to a conical body portion 27$^a$. While I have shown the blades 28 and 28$^a$ as curved, it is apparent that they may be made straight if desired. Secured within the hood 12 are inclined deflectors 29, there being one of these deflectors at each side of the hood. A centrally arranged nose shaped deflector 30 is also secured to the inner face of the rear wall of the hood.

The operation of the device is as follows: As the fertilizer distributer is drawn over the ground in the usual manner, the rotation of the ground wheels imparts rotation to the beater in the direction of the arrow $a$. The fertilizer which is contained within the body 5 and which is fed rearwardly against the beater by the movement of the bottom 6 in the usual manner, is thrown rearwardly by the beater and strikes against the rear wall 12$^a$ of the hood 12. The inclined deflectors 29 conduct the bulk of the material well over the horizontally rotating distributer members 26, the direction of rotation of said members being indicated by the arrows $b$ in Fig. 2. The nose shaped deflector 30 causes the material to fall well forward upon the distributer members, it being apparent that if this nose shaped deflector were not present, that portion of the material striking against the center of the rear wall would fall straight downward and a large portion of it would pass between the distributer members without touching them. The rotation of the distributer members 26 results in hurling the fertilizer broadcast to the rear of the machine, spreading it evenly in a wide swath or path not only directly in the rear of the machine, but to some distance upon each side thereon. If desired, an apron 31 may be located in front of the distributer members to prevent the material from being thrown off at the front thereof.

From the foregoing description, it will be seen that my invention is in the nature of an attachment which may be readily applied to the fertilizer distributers already in use with little or no alteration thereof.

While I have shown in the accompanying drawing a method of constructing the device, it is of course apparent that many changes might be resorted to as regards the constructing of the framework for supporting the vital elements that comprise the invention. Likewise, the number of blades upon the distributer members may be varied at will and these members may be made of any desired material so long as they are so constructed as to prevent rusting or corrosion. Furthermore, the method of driving these distributer members may be varied if desired. For instance, instead of connecting them to the beater shaft, they may be connected direct to the ground wheels or driven from any other of the moving parts of the machine. I prefer to make the deflectors of sheet iron, the surface of which will be polished and smooth, though these deflectors may be of other material and their pitch may be varied at will to direct the material to any desired point upon the face of the rotating distributer members.

A fertilizer distributer constructed in accordance with the present invention has been actually tested by me and whereas the beater type of distributer to which my attachment was applied and upon which it was tested, spread the fertilizer material in a path or swath of about three feet wide before my attachment was applied thereto, said material was spread in a path or swath from ten to twelve feet wide by the use of this attachment. Furthermore, where the beater alone is employed for hurling the material rearwardly, the material is not only noticeably thicker at the middle of the swath than at the edges, but the material often passes over the beater in large unscattered bunches, falling thus upon the ground. This objectionable result is avoided by the use of the present invention, the swath spread by my invention being uniform throughout its width and furthermore, every particle of the material being thoroughly pulverized and scattered by coming in contact with the rapidly rotating distributers.

From the foregoing facts disclosed by actual test, it will be readily apparent that much less time will be required to cover a given area with fertilizing material by the use of my attachment than would be the case if said attachment were not employed. Furthermore, this attachment is well adapted to handle any character of fertilizing material that can be thrown rearwardly by the beater. The attachment is comparatively small and does not interfere with the ready passage of the machine through gates, doors, or other openings, and if for any reason it is desired to remove it, this may be done by merely removing the fastenings 13 and 15. Furthermore, if the distributer members 26 and the deflectors are removed and the hood left in place, the hood acts as a wind shield to prevent the material from being blown about by the wind as it is discharged from the beater, and the rear wall of the hood causes the material to drop straight down upon the ground. The attachment increases the draft but very little because the only actual resistance to the movement of the distributer members is due to the loose fertilizer falling upon them and being thrown therefrom by centrifugal force.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. The combination with a fertilizer distributer comprising a body portion having a movable apron bottom, of a beater extending across the rear end of said body portion, a hood arranged over said beater and into which said beater discharges the load from said apron, a pair of oppositely rotating, horizontally disposed distributer members underlying said beater, said hood having an open bottom to permit the material to fall directly therefrom upon said distributers, said distributers comprising solid body portions adapted to receive and support the fertilizing material until said material is thrown therefrom by centrifugal force, and deflectors carried by the hood and disposed in such manner as to cause the material to be deposited on the distributers upon the inner sides of their axes.

2. The combination with a fertilizer distributer comprising a body portion having a movable apron bottom, of a beater extending across the rear end of said body portion, a hood arranged over said beater and in o which said beater discharges the load from said apron, a pair of oppositely rotating, horizontally disposed distributer members underlying said beater, said hood having an open bottom to permit the material to fall directly therefrom upon said distributers, said distributers comprising solid body portions adapted to receive and support the fertilizing material until said material is thrown therefrom by centrifugal force, a central deflector serving to direct the material outwardly to prevent it from falling between the distributers, and outer deflectors serving to direct the material inwardly, the combined action of said deflectors causing the material to be deposited upon the distributers between their inner edges and their axes.

3. The combination with a fertilizer distributer of the beater type, of a hood arranged over the beater thereof, a pair of oppositely rotating distributer members arranged substantially horizontally beneath said hood, the material from said beater falling from said hood upon said distributer members, and deflectors mounted adjacent the rear wall of said hood for directing said material, there being a centrally arranged nose shaped deflector and a downwardly and inwardly inclined deflector upon each side thereof, each of said distributer members comprising a solid body portion adapted to receive and support the fertilizing material until said material is thrown therefrom by centrifugal force.

4. In a device of the character described, the combination with a fertilizer distributer of the beater type, of a removable hood carried thereby and inclosing said beater, a centrally arranged nose shaped deflector mounted upon the rear wall of said hood, an inclined deflector mounted at each side of the rear wall of the hood, a pair of oppositely rotating cone-shaped distributer members mounted substantially horizontally beneath said hood, fertilizer material engaging blades mounted upon the upper face of said distributer members, and drive connections between the beater and said distributer members, each of said distributer members comprising a solid body portion adapted to receive and support the fertilizing material until said material is thrown therefrom by centrifugal force.

5. The combination with a fertilizer distributer of the beater type, of a hood arranged over the beater thereof, a pair of oppositely rotating distributer members arranged substantially horizontally beneath said hood, the material from said beaters falling from said hood upon said distributer members, each of said distributer members comprising a solid body portion adapted to receive and support the fertilizing material until said material is thrown therefrom by centrifugal force, a plurality of radially disposed material engaging blades upon the upper faces of said body portions, and a plurality of deflectors secured to the rear wall of the hood above said distributer members, there being an inwardly directed deflector at each end of the hood and a centrally arranged, nose shaped deflector at the center of the hood, said nose shaped deflector causing the material to be separated at the central line of the hood.

6. The combination with a fertilizer distributer of the beater type, of a hood arranged over the beater thereof, a pair of oppositely rotating distributer members arranged substantially horizontally beneath said hood, the material from said beaters falling from said hood upon said distributer members, each of said distributer members comprising a solid body portion adapted to receive and support the fertilizing material until said material is thrown therefrom by centrifugal force, a plurality of radially disposed material engaging blades upon the upper faces of said body portions, a plurality of deflectors secured to the rear wall of the hood above said distributer members, there being an inwardly directed deflector at each end of the hood and a centrally arranged, nose shaped deflector at the center of the hood, said nose shaped deflector causing the material to be separated at the central line of the hood, and a transversely extending apron which spans the hood in front of said distributer members and which lies close to said distributer members to prevent the material from being thrown from the front of said members.

7. The combination with a fertilizer distributer of the beater type, of a hood arranged over the beater thereof, a pair of oppositely rotating distributer members arranged substantially horizontally beneath said hood, the material from said beaters falling from said hood upon said distributer members, each of said distributer members comprising a solid body portion adapted to receive and support the fertilizing material until said material is thrown therefrom by centrifugal force, a plurality of radially disposed material engaging blades upon the upper faces of said body portions, and a transversely extending apron which spans the hood in front of said distributer members to prevent the fertilizing material from being thrown from the front of said members.

8. The combination with a fertilizer distributer of the beater type, of a pair of rearwardly projecting bars, means for securing said bars to the body of the fertilizer distributer, a hood carried by said bars and arranged over said beater, a cross bar supported from the rear ends of said bars, hangers carried thereby, a transverse shaft mounted in said hangers, means for driving said shaft, and a pair of spaced vertically arranged shafts journaled in said cross bar, bevel gear connections between said transverse shaft and said vertical shafts for imparting rotation to the vertical shafts in opposite directions, rotative distributer members secured to said vertical shafts, each of said distributer members comprising a solid body portion adapted to support the fertilizing material until said material is thrown therefrom by centrifugal force, radially arranged, material engaging blades upon the upper faces of said body portions, a deflector arranged at each end of the hood and arranged to direct the material inwardly over said deflectors and a centrally arranged, nose shaped deflector secured to the rear wall of the hood and arranged to cause the material to separate at the central line of the hood and to be directed in opposite directions upon said distributer members.

In testimony whereof I affix my signature in presence of two witnesses.

LUTHER B. BARTH.

Witnesses:
 CALVIN D. SPITLER,
 ARMINDA D. MORLOCK.

---

Copies of this patent may be obtained for five cents each, by addressing the "Commissioner of Patents, Washington, D. C."